United States Patent [19]
Backman et al.

[11] Patent Number: 6,128,355
[45] Date of Patent: Oct. 3, 2000

[54] SELECTIVE DIVERSITY COMBINING

[75] Inventors: Johan Backman, Stockholm; Thomas Lindqvist, Sundsvall; Stefan Håkansson, Solna, all of Sweden

[73] Assignee: Telefonaktiebolget LM Ericsson, Stockholm, Sweden

[21] Appl. No.: 08/861,541

[22] Filed: May 21, 1997

[51] Int. Cl.$^7$ .............................. H04B 7/08; H04L 1/02
[52] U.S. Cl. .................... 375/347; 455/133; 455/137
[58] Field of Search ................... 375/347, 267, 375/224, 227; 455/65, 303, 272, 273, 278.1, 134, 135, 137, 277.2, 140, 226.2, 226.3, 132, 133

[56] References Cited

U.S. PATENT DOCUMENTS

| | | | |
|---|---|---|---|
| 5,203,026 | 4/1993 | Ekelund | 375/347 |
| 5,528,581 | 6/1996 | De Bot | 375/347 |
| 5,553,102 | 9/1996 | Jasper et al. | 375/347 |
| 5,684,793 | 11/1997 | Kiema et al. | 455/135 |
| 5,787,131 | 7/1998 | Bottomley | 375/347 |
| 5,796,788 | 8/1998 | Bottomley | 375/341 |
| 5,848,361 | 12/1998 | Edwards | 455/562 |

FOREIGN PATENT DOCUMENTS

| | | | |
|---|---|---|---|
| 0 600 547 | 6/1994 | European Pat. Off. | H04B 7/08 |
| WO93/18593 | 9/1993 | WIPO | H04B 7/10 |

OTHER PUBLICATIONS

Feeney et al., "The Performance of Various Diversity Combiners on Signals Received at a Base–Station Site", XP–00205312 Land Mobile Radio. Third International Conference (Publ. No. 65), Cambridge, UK, Dec. 10–13, 1985, pp. 55–62.

Karlsson et al., "Interference Rejection Combining for GSM", XP002053626. Gateway to the Twenty Firrst Century. International Conference on Universal Personal Communications. 1996 $5^{th}$ IEEE International Conference on Universal Personal Communications Record (Cat. No. 96th8185), Proceedings of ICPUC– 5th International Conference, New York, NY, pp. 433–437.

*Mobile Communication Design Fundamentals*, by William C.Y. Lee (Wiley, 1993), pp. 116–132.

*Primary Examiner*—Stephen Chin
*Assistant Examiner*—Betsy L. Deppe
*Attorney, Agent, or Firm*—Burns, Doane, Swecker & Mathis, L.L.P.

[57] ABSTRACT

A method and system for combining signals in a receiver employing antenna diversity. If the interference exceeds a predetermined threshold, interference rejection combining (IRC) is used. If the interference does not exceed the predetermined threshold, maximum ratio combining (MRC) is used. The diversity combining technique can be selected, and the signals combined every burst, half-burst, or other suitable interval.

31 Claims, 6 Drawing Sheets

SELECTIVE DIVERSITY COMBINING

FIELD OF THE INVENTION

The present invention relates generally to the processing of digitally modulated radio signals at a receiver having multiple antennas. More particularly, the present invention relates to the diversity combining of radio signals to reduce signal impairments.

BACKGROUND OF THE INVENTION

In radio communications, signals are sometimes lost or impaired due to a variety of phenomena such as multipath fading, time dispersion, and co-channel interference which exist in a typical radio communication channel. Multipath fading results from the interaction of the transmitted signal and its reflections or echoes which arrive at the receiver at approximately the same time. If the number of reflections is relatively large, this fading exhibits a so-called Rayleigh distribution. Time dispersion occurs when there is a time delay between the reflections and the transmitted signal. Interference results from the presence of signals which are non-orthogonal with respect to the transmitted signal. Such non-orthogonal signals can originate from other radios operating on the same frequency (co-channel interference) or from other radios operating on neighboring frequency bands (adjacent channel interference).

FIG. 1 shows an example of co-channel interference, in which a mobile station M1 communicates with a base station antenna A1 in a cell C1, while a mobile station M2 communicates with a base station antenna A2 in a cell C2. A base station antenna A3 serving a cell C3 may be located between cells C1 and C2. In this example, mobile stations M1 and M2 are simultaneously communicating on the same channel to different antennas in different cells. As shown, signals transmitted by mobile station M1 to antenna A1 interfere with the signals transmitted by mobile station M2 to antenna A2, causing signal impairment.

To reduce the effects of such signal impairments, it is known to use diversity combining, in which a receiver is provided with multiple separated antennas, and the received signals at each of the antennas are combined. Because the antennas are separated, the signal strength in each antenna is independent. Thus, if there is a deep fading dip for one antenna, another antennas may have a relatively strong signal. There are many types of diversity combining methods. For example, in *Mobile Communication Design Fundamentals*, by William C. Y. Lee (Wiley, 1993), numerous diversity schemes are described at pages 116–132.

In a typical mobile communication system, antenna diversity is employed by providing base stations with multiple antennas. The signals received at the antennas are typically combined using maximum ratio combining (MRC). Lee, supra for example, recognizes MRC as the best combining technique. In MRC, the received signals are combined based on the assumption that the interference closely approximates white Gaussian noise. An exemplary MRC scheme is shown in FIG. 2, where each signal branch (i.e., each received signal to be combined) is weighted by a selected weighting factor ($\alpha_1$, $\alpha_2$), and the signal branches are combined. MRC does not consider correlation between received signals, thereby enabling the received signals to be detected and equalized one at a time, and then combined by summing. MRC, since it assumes that the interference experienced by a signal closely approximates white Gaussian noise, has certain performance limitations when the interference does not closely approximate white Gaussian noise.

Alternatively, an improved method of combining received signals in a system with antenna diversity is known as interference rejection combining (IRC). IRC assumes that the received signals include both white Gaussian noise and signals from other transmitters (e.g., other mobile stations in other cells). Generally speaking, a receiver incorporating IRC produces received signal samples for each antenna (using, e.g., log-polar signal processing), estimates channel taps for each antenna, estimates impairment correlation properties (e.g., co-channel interference), forms branch metrics from the received signal samples, channel tap estimates, and impairment correlation estimates, and estimates the transmitted information sequence using the branch metrics (using, e.g., the Viterbi algorithm). The receiver estimates impairment correlation properties by estimating the correlated noise between signal branches when a training sequence (such as is contained in a typical GSM burst) is received. This estimated covariance is used by the receiver during the demodulation process. IRC is described in significant detail in the copending, commonly-assigned application Ser. No. 08/284,775 entitled "Method and Apparatus for Interference Rejection Combining in Multi-Antenna Digital Cellular Communications Systems", filed on Aug. 2, 1994 and copending, commonly assigned application Ser. No. 08/634,719 entitled "Method and Apparatus for Interference Rejection with Different Beams, Polarizations, and Phase References", filed on Apr. 19, 1996. These applications are hereby incorporated by reference in their entirety. The latter patent application discloses that IRC performance can be improved if the impairment correlation properties are scalar impairment correlation properties and the branch metrics are scalar branch metrics.

IRC is very efficient in rejecting interference from mobile stations from neighboring cells which transmit at the same frequency as the transmitted signal of interest (i.e., co-channel interference), particularly when an interfering burst is synchronized with the carrier burst (i.e., the transmitted signal of interest). IRC also reduces the effects of adjacent channel interference. Unfortunately, IRC is complex and requires a relatively large amount of computer processing resources. Further, there are some cases where IRC does not provide optimum performance.

It would be desirable to improve the performance of a communication system employing antenna diversity. More particularly, it would be desirable to improve known methods of diversity combining.

SUMMARY OF THE INVENTION

The present invention overcomes the above-described problems, and provides additional advantages, by providing for a method and system for combining received signals from multiple antennas which employs both IRC and MRC (or some other diversity combining method). According to exemplary embodiments of the invention, a transmitter generates and transmits a signal representing an sequence of information symbols. A receiver having multiple antennas receives the transmitted signal on at least two antennas such that there are at least two received signals. The receiver combines the received signals by selectively performing interference rejection combining or maximum ratio combining to maximize the receiver performance. The signals can be combined every burst, half-burst, or at some other suitable frequency. To select whether IRC or MRC is used, the receiver determines an interference indication, and a combining method is selected based on the interference indication.

By selectively performing IRC, a conventional diversity combining scheme, or a combination of multiple schemes, the present invention allows a communication system to achieve the benefits of IRC when most appropriate (that is, when the interference is predominantly co-channel interference), adjacent channel interference or otherwise correlated between the diversity branches, and to save processing resources at times when IRC is not appropriate (that is, when co-channel interference is relatively low and the interference more closely approximates white Gaussian noise). This selective combination scheme greatly enhances the efficiency of the communication. For example, as discussed below, the present invention makes it is possible to achieve a 1 dB gain in performance over a system which uses only IRC.

BRIEF DESCRIPTION OF THE DRAWINGS

A more complete understanding of the present invention can be obtained upon reading the following Detailed Description of the Preferred Embodiments, in conjunction with the accompanying drawings, in which like reference indicia are used to designate like elements, and in which.

DETAILED DESCRIPTION OF THE PREFERRED EMBODIMENTS

Figure 1:
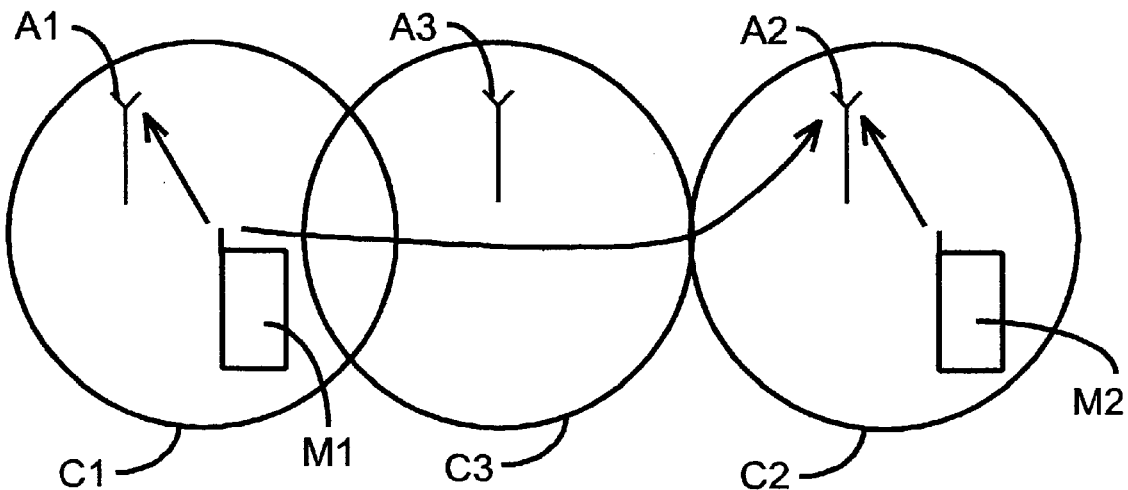
FIG. 1 is a diagram showing an example of co-channel interference.
Figure 2:
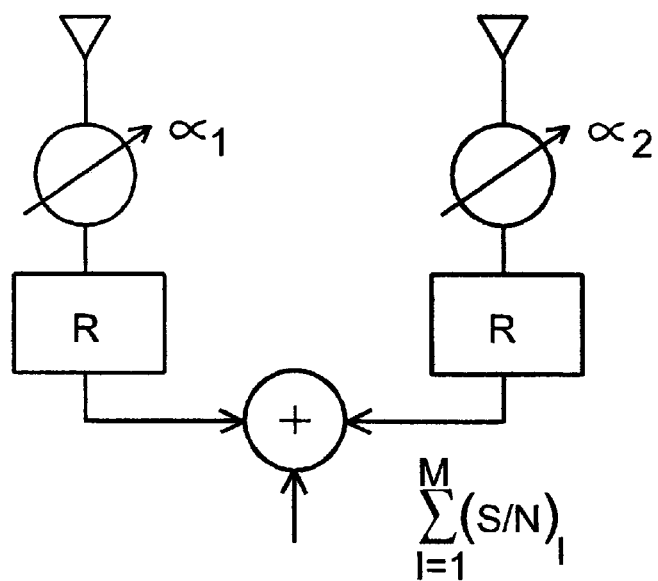
FIG. 2 is a block diagram showing a diversity combining technique using MRC.
Figure 3:
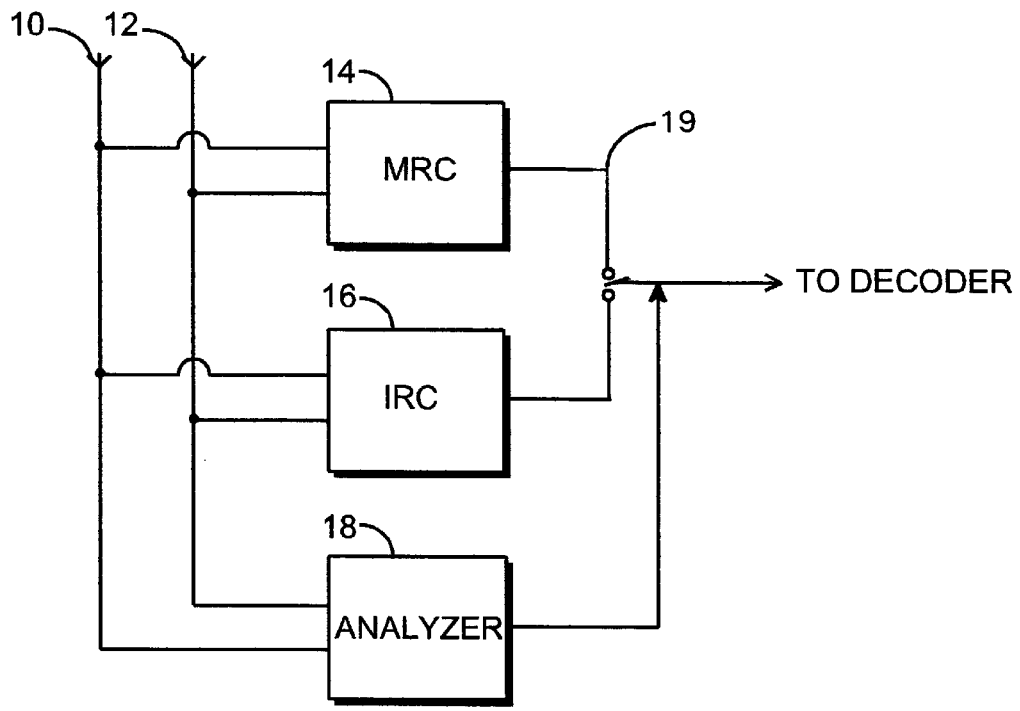
FIG. 3 is a block diagram showing an implementation of a preferred embodiment of the present invention.

FIG. 3 shows a block diagram of a first exemplary embodiment of the invention. Antennas 10 and 12, which are two of multiple antennas in a receiver employing antenna diversity, receive signals transmitted from a mobile station or other transmitter (not shown). Combiner modules 14 and 16 are each connected to receive the received signals from antennas 10 and 12. Combiner modules 14 and 16 are capable of combining the received signals from antennas 10 and 12 using MRC (or some other conventional diversity combining technique) and IRC, respectively, and outputting a combined signal to a decoder or other signal processing circuitry (not shown). The appropriate combiner module 14 or 16 is activated by an interference analyzer 18, which determines whether the interference experienced by the received signals exceeds a predetermined threshold, and selects the appropriate combiner module using a switch 19. To determine whether the threshold is met or exceeded, the analyzer 18 can estimate a correlation between two branches for each received signal and compare the estimated correlation to a correlation threshold. For example, an impairment correlation matrix can be formed, and the off-diagonal elements of the impairment correlation matrix can be used to measure the correlation and interference. A suitable threshold can then be derived from the diagonal elements of the matrix. Impairment correlation matrices are discussed in more detail in the copending, commonly-assigned application entitled "Method and Apparatus for Interference Rejection Combining in Multi-Antenna Digital Cellular Communications Systems" and bearing Ser. No. 08/284,775, now issued as U.S. Pat. No. 5,680,419, the entirety of which is incorporated by reference. Numerous other threshold calculation and comparison schemes can be used. If an interfering burst is synchronized with the carrier burst of the transmitted signal of interest, the estimated correlation will be constant during a burst. If, as is more typical, an interfering burst is not synchronized with the carrier burst, the estimated correlation will not be constant during the burst. If the interference (or other suitable impairment characteristic) meets or exceeds the predetermined threshold, then the interference analyzer 18 selects the IRC combiner module 16. If the interference (or other suitable impairment characteristic) does not meet or exceed the predetermined threshold, the interference analyzer 18 selects the MRC combiner module 14. The selected module outputs a combined signal to a decoder (not shown) in the receiver for further processing. The circuit of FIG. 3 can operate to combine the received signals every burst, half-burst, or other suitable interval.

Figure 4:
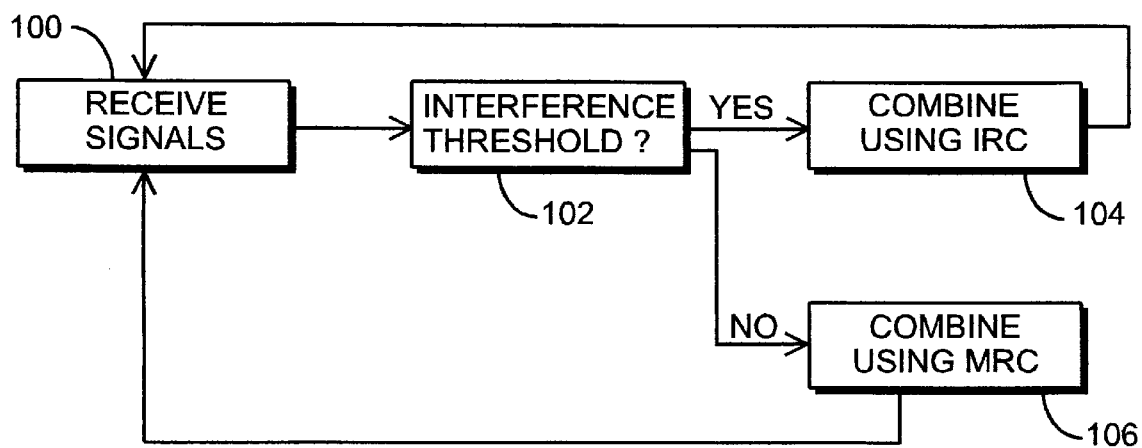
FIG. 4 is a flow chart describing a preferred embodiment of the method according to the present invention.

FIG. 4 shows a flow chart describing the steps of the method according to the present invention. In step 100, the receiver receives the signals transmitted by the mobile station or other transmitter on multiple antennas. In step 102, the receiver (e.g., using analyzer 18 or other suitable means) analyzes the received signals to determine if the level of interference meets or exceeds a predetermined threshold. If the interference threshold used in step 102 is met or exceeded by the received signals, the receiver combines the multiple received signals using IRC in step 104, and if the interference threshold used in step 102 is not met or exceeded by the received signals, the receiver combines the multiple received signals using MRC (or another suitable diversity combining technique) in step 106. Regardless of which combining method is used, the process returns to step 100 after some predetermined interval to process other received signals. The predetermined interval can be every burst, half-burst, or other suitable interval. As a result, the appropriate diversity combining technique can be selected for each interval.

Figure 5:
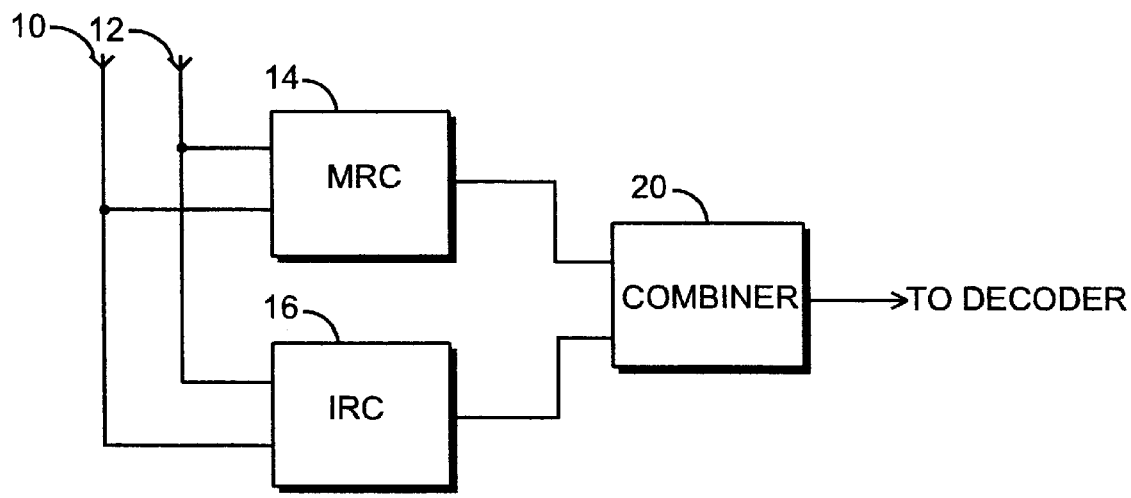
FIG. 5 is a block diagram showing a second exemplary embodiment of the present invention.

FIG. 5 shows a block diagram of a second exemplary embodiment of the present invention. In this embodiment, both MRC and IRC are used for combining the branches, and then the outputs of combiner modules 14 and 16 are combined in combiner 20 so as to optimize the output from each combination algorithm. Combiner 20 can combine the MRC and IRC outputs each burst, half-burst, or at some other suitable period. The embodiment of FIG. 5 is particularly beneficial when interference is present, and the carrier bursts and interfering bursts are unsynchronized.

Figure 6:
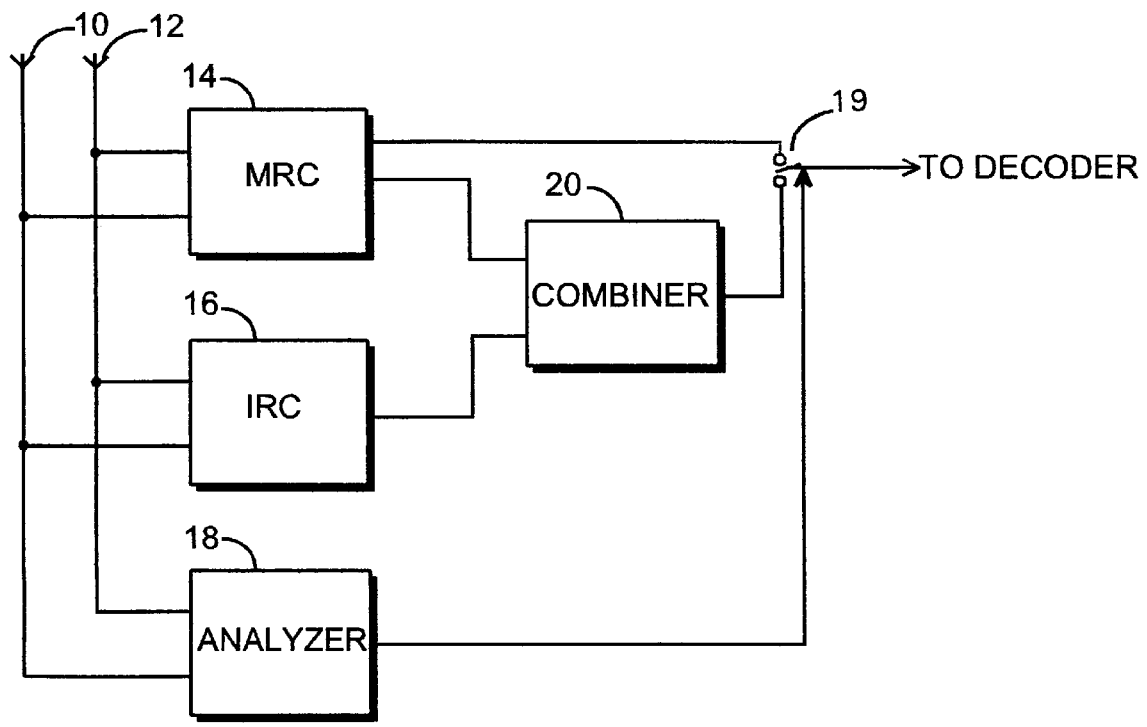
FIG. 6 is a block diagram of an exemplary combination of the embodiments of FIG. 3 and FIG. 5.

Thus, the embodiment of FIG. 3 provides improved performance over using only IRC when no interference is present, and the embodiment of FIG. 5 provides improved performance when interference is present and the interfering bursts are not synchronized with the carrier bursts. The embodiments of FIG. 3 and FIG. 5 can be combined to maximize the performance of both embodiments. One exemplary combination of these embodiments is shown in FIG. 6, in which analyzer 18 analyzes the incoming signals and selects, via switch 19, either the output of combiner 20 or MRC combiner module 14 based on an interference indication.

Figure 7:
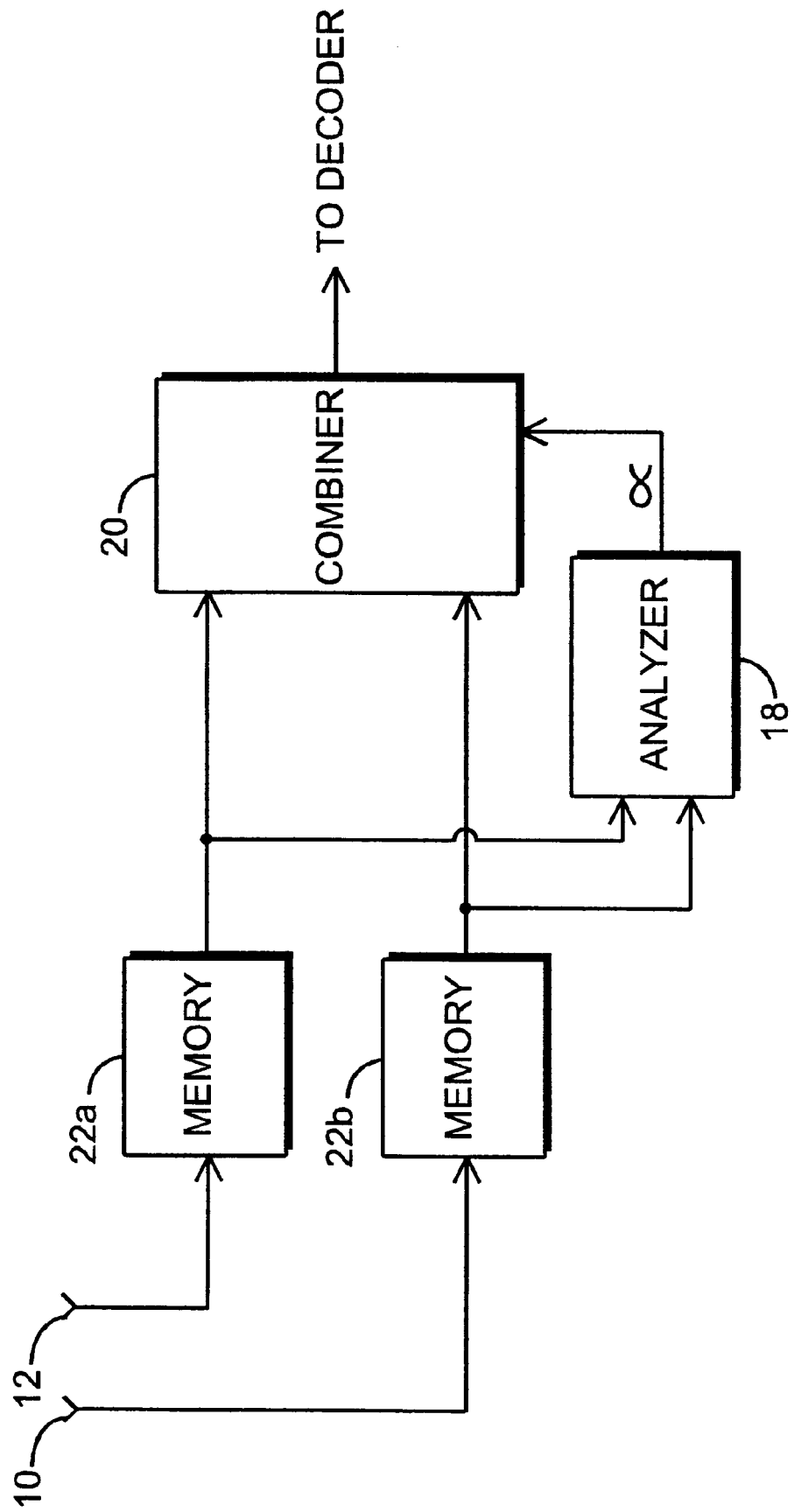
FIG. 7 is a block diagram of another embodiment of the present invention.

FIG. 7 shows yet another embodiment of the present invention which includes memories 22a and 22b for storing signal bursts, analyzer 18 for analyzing the stored bursts, and combiner 20 for combining the signals in a manner dependent upon the output of analyzer 18. In this embodiment, the analyzer 18 determines a value a, based on the level of interference associated with the received bursts. The value a is a weighting factor which determines how much weight is assigned to differing diversity combining techniques. For example, an factor of 1 can be assigned by the analyzer 18 when the interference level is such that IRC would be a preferable combining technique. For an alpha factor of 1, the combiner 20 uses IRC. An $\alpha$ factor of 0 can be assigned when the interference level is such that another diversity combining technique (e.g., MRC) would be preferable. For an $\alpha$ factor of 0, the combiner 20 uses MRC. An $\alpha$ factor of 0.5 can be assigned when the interference level is such that a weighted combination of 50% IRC and 50% MRC would be desirable. For an $\alpha$ factor of 0.5, IRC and MRC are both performed, and the results combined equally. For an $\alpha$ factor of 0.75, IRC and MRC are both performed, and the results are combined by weighting the IRC results to the MRC results in a ratio of 3/1. In this embodiment, a "soft" or gradual shifting of combining techniques can be achieved. In this embodiment, the combiner 20 is implemented by a programmable combiner.

Figure 8:
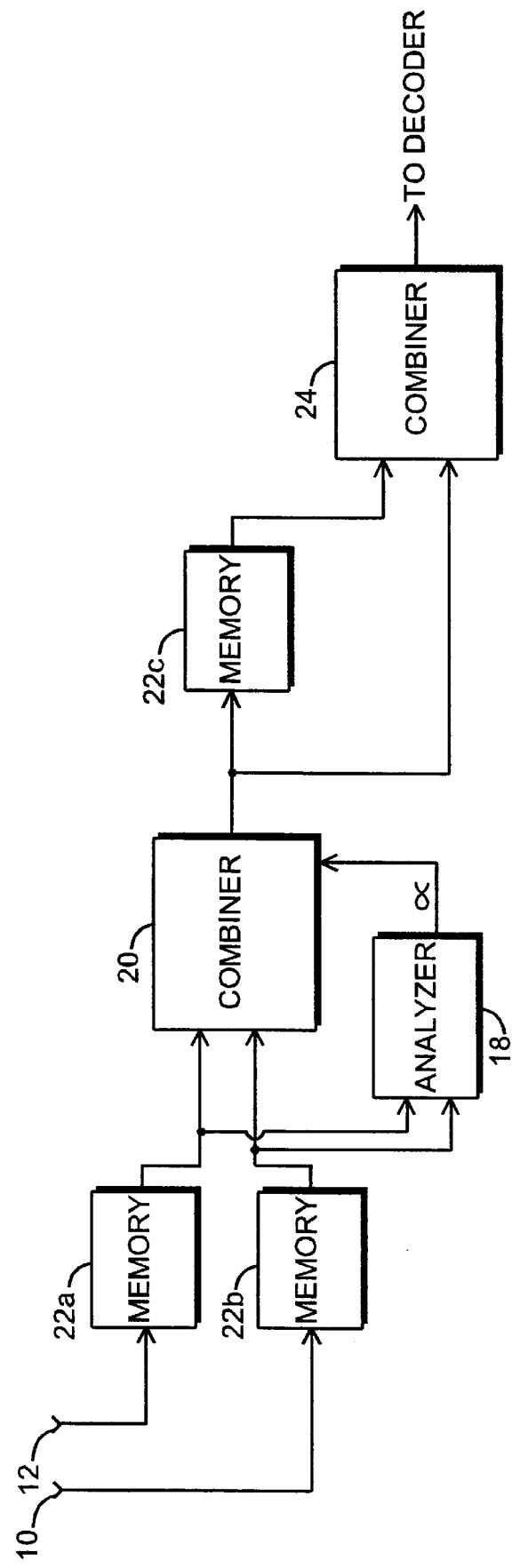
FIG. 8 is a block diagram of a variation of the embodiment of FIG. 7.

FIG. 8 shows a variation of the embodiment of FIG. 7. In the embodiment of FIG. 8, received bursts are stored in the memories 22a and 22b. Analyzer 18 determines the level of interference, and assigns an appropriate $\alpha$ value. Combiner 20 combines the stored bursts in a manner dependent upon the analyzer output, and the output of combiner 20 is stored in a memory 22c. The analyzer 18 then resets $\alpha$ to, for example, 0 and performs a second combining. The output of this second combining is then combined with the first combining results stored in memory 22c in a combiner 24. Numerous other variations will be readily apparent to those of ordinary skill in the art.

Figure 9:
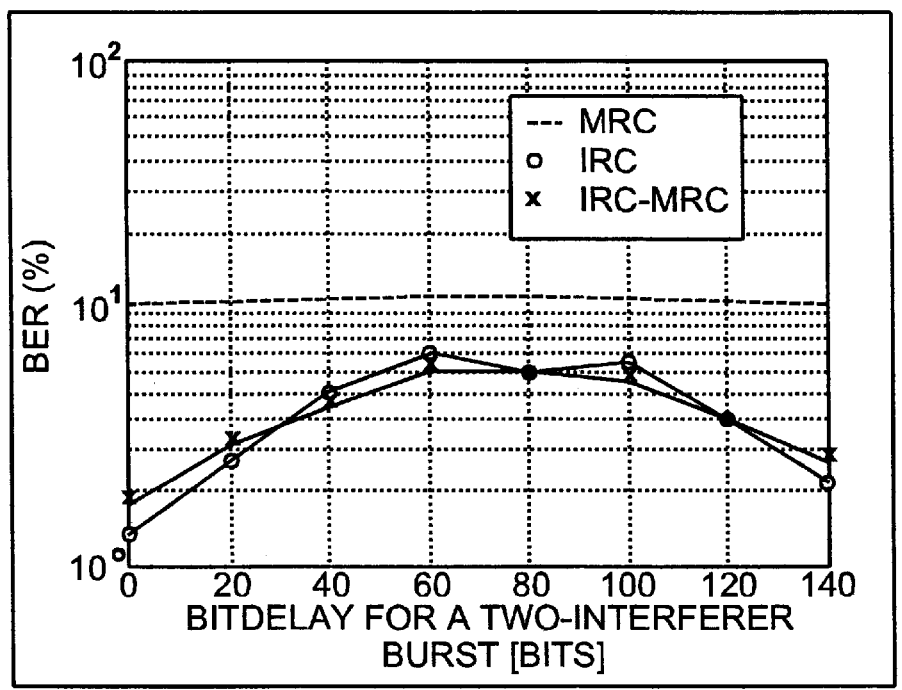
FIG. 9 is a graphical comparison of performance results for a receiver using a combination of IRC and MRC according to the embodiment of FIG. 5.

FIG. 9 is a graphical representation comparing bit error rates (BERs) as a function of interferer delay for a communication channel for the embodiment of FIG. 5. In the graph of FIG. 9, the combination of IRC and MRC (IRC-MRC) is implemented by combining the received signals every burst (i.e., on a burst-by-burst basis). Further, the signal-to-noise (SNR) ratio is assumed to be 25 dB, and the carrier-to-interference ratio (C/I) is assumed to be 2 dB. As can be seen from the graph, the combination of IRC and MRC can provide a performance improvement over the case for a receiver using only IRC.

Figure 10:
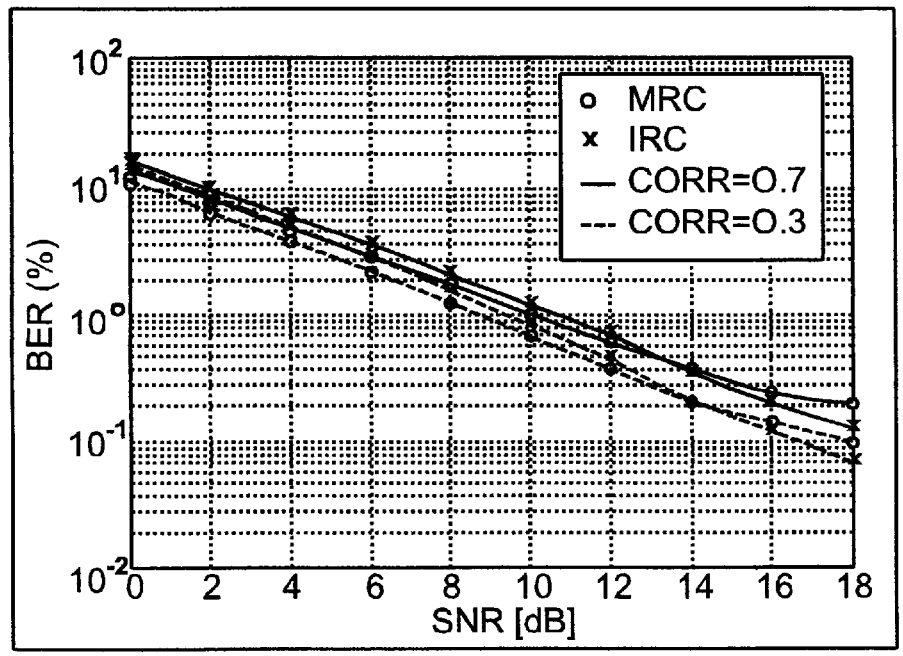
FIG. 10 is a graphical comparison of performance results for the embodiment of FIG. 3.

FIG. 10 is a graphical representation comparing bit error rates as a function of the signal-to-noise ratio (SNR) for the embodiment of FIG. 3, where the IRC algorithm is switched off, or not selected, during periods where no co-channel interference is present. As shown, it is possible to gain approximately 1 dB in sensitivity compared to the case where IRC is always used.

Thus, it should be apparent that the present invention provides significant advantages over known diversity combining techniques. In particular, by selectively using IRC and MRC or another suitable diversity combining technique, receiver performance can be improved compared to a receiver using only one diversity combining technique. It will be appreciated that the principles of the present invention can be applied to systems which use more than two different combining techniques.

While the foregoing description includes numerous details and specificities, it is to be understood that these are for purposes of explanation only. Many modifications will be readily apparent to those of ordinary skill in the art which are clearly within the spirit and scope of the invention, as defined by the following claims and their legal equivalents. More than two different diversity combining techniques may be combined.

What is claimed is:

1. A method for diversity combining in a radio communication system, comprising the steps of:
   receiving a transmitted signal on at least two antennas such that at least two received signals exist;
   combining the received signals by using interference rejection combining together with another diversity combining method.

2. The method of claim 1, wherein the step of combining is performed by separately performing both interference rejection combining and the another diversity combining method to achieve separate results, and combining the separate results.

3. The method of claim 2, wherein the another diversity combining method is maximum ratio combining.

4. The method of claim 2, wherein the separate results are weighted prior to combining.

5. The method of claim 1, wherein the step of combining further comprises the steps of:
   producing an interference indication;
   determining a weight factor based on the interference indication; and
   combining the received signals using a weighted combination of interference rejection combining and the another diversity combining technique.

6. A method for diversity combining in a radio communication system comprising the steps of:
   receiving a transmitted signal on at least two antennas such that at least two received signals exist;
   producing an interference indication;
   selecting, based on the interference indication, a combining method from a plurality of combining methods; and
   combining the signals using the selected combining method,
   wherein the step of producing an interference indication is performed by estimating a covariance for each received signal and comparing the estimated covariances to a covariance threshold.

7. The method of claim 6, wherein the combining method is selected from at least one of maximum ratio combining and interference rejection combining.

8. The method of claim 7, wherein interference rejection combining is performed by:
   producing received signal samples for each antenna, estimating channel taps for each antenna, estimating impairment correlation properties among the antennas, forming branch metrics from the received signal samples, channel tap estimates, and impairment correlation estimates, and estimating the information sequence using the branch metrics.

9. The method of claim 6, wherein the received signals include one or more bursts, and the combining method is selected for each burst.

10. A method for diversity combining in a radio communication system comprising the steps of:
    receiving a transmitted signal on at least two antennas such that at least two received signals exist;
    producing an interference indication;
    selecting, based on the interference indication, a combining method from a plurality of combining methods; and combining the signals using the selected combining method, wherein the received signals include one or more bursts, and the combining method is selected for each half-burst.

11. The method of claim 10, wherein the step of producing an interference indication is performed by estimating a covariance for each received signal and comparing the estimated covariances to a covariance threshold.

12. A system for receiving communication signals, comprising:
a plurality of antennas for receiving a communication signal such that multiple received signals are present;
a plurality of signal combiners for combining the received signals, each signal combiner associated with each of the plurality of antennas; and
analyzer means for determining a level of signal impairment, comparing the level of signal impairment to a threshold level, and selectively operating said signal combiners based on the comparison.

13. The system of claim 12, wherein the plurality of signal combiners includes a first signal combiner using interference rejection combining and a second combiner using maximum ratio combining.

14. The system of claim 13, wherein the level of signal impairment is interference.

15. The system of claim 13, wherein the first combiner produces received signal samples for each antenna, estimates channel taps for each antenna, estimates impairment correlation properties among the antennas, forms branch metrics from the received signal samples, channel tap estimates, and impairment correlation estimates, and estimates the information sequence using the branch metrics.

16. The system of claim 12, wherein the received signals include one or more bursts, and the selection of combiners is performed every burst.

17. The system of claim 12, wherein the received signals include one or more bursts, and the selection of combiners is performed every half-burst.

18. A system for receiving communication signals, comprising:
a plurality of antennas for receiving a communication signal such that multiple received signals are present, wherein each received signal is a substantially identical copy of the communication signal;
a plurality of signal combiners, each signal combiner combining received signals using a different one of a plurality of signal combining techniques;
a combiner for combining outputs of at least selected ones of the signal combiners; and
means for determining a level of signal impairment, comparing the level of signal impairment to a threshold level, and selecting one of either the combined signal combiner output or an output of one of the plurality of signal combiners as a system output.

19. The system of claim 18, wherein one of the plurality of signal combining techniques is interference rejection combining.

20. The system of claim 18, wherein the level of signal impairment is interference.

21. A system for receiving communication signals, comprising:
a plurality of antennas for receiving a communication signal such that multiple received signals exist;
an analyzer for determining an interference indicator associated with the received signals, and for selecting a weighting factor based on the interference indicator; and
a first signal combiner for performing a weighted combination of at least two signal combining techniques based on the weighting factor.

22. The system of claim 21, wherein one of the signal combining techniques is interference rejection combining.

23. The system of claim 22, wherein another signal combining technique is maximum ratio combining.

24. The system of claim 21, further comprising one or more memories for storing the received signals for analysis by the analyzer.

25. The system of claim 24, further comprising:
a combiner output memory for storing a first output of the first signal combiner; and
a second signal combiner for combining the stored first output with a second output of the first signal combiner.

26. A method for diversity combining in a radio communication system, comprising the steps of:
receiving a transmitted signal on at least two antennas such that at least two received signals exist; and
combining received signals by selecting, based on a signal impairment, between at least a first combining method and a second combining method.

27. The method of claim 26, wherein at least one of the first combining method and the second combining method is a combination of at least two combining methods.

28. The method of claim 26, wherein the first combining method is maximum ratio combining and the second combining method is interference rejection combining.

29. A method for diversity combining in a radio communication system, comprising the steps of:
receiving a transmitted signal on at least two antennas such that at least two received signals exist;
combining received signals using a plurality of combining methods wherein each combining method produces a separate result; and
combining the separate results, wherein each separate result is assigned a weight factor before the separate results are combined.

30. The method of claim 29, wherein the weight factor of at least one separate result is dependent on an interference indication.

31. A method of receiving communication signals, comprising the steps of:
receiving a communication signal such that multiple received signals are produced;
combining a plurality of the multiple received signals, thereby producing a plurality of combinations, by performing at least the steps of:
combining at least two of the multiple received signals according to a first signal combining technique, thereby producing a first combination; and
combining at least two of the multiple received signals according to a second signal combining technique, thereby producing a second combination;
combining selected combinations;
determining a level of signal impairment;
comparing the level of signal impairment to a threshold level; and
based on the comparing step, selecting either a combination or the combined selected combinations as an output signal.

* * * * *